United States Patent
Gardner, Jr. et al.

(10) Patent No.: US 9,518,245 B2
(45) Date of Patent: Dec. 13, 2016

(54) DETERGENT AND RINSE-AID COMPOSITIONS CONTAINING A ZWITTERIONIC SULFONATED SILANE AND METHODS OF USING

(71) Applicant: 3M INNOVATIVE PROPERTIES COMPANY, St. Paul, MN (US)

(72) Inventors: James P. Gardner, Jr., Stillwater, MN (US); Zachary J. Malmberg, Coon Rapids, MN (US); Justin A. Riddle, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/571,444

(22) Filed: Dec. 16, 2014

(65) Prior Publication Data

US 2015/0166935 A1 Jun. 18, 2015

Related U.S. Application Data

(60) Provisional application No. 61/916,689, filed on Dec. 16, 2013.

(51) Int. Cl.
*C11D 1/92* (2006.01)
*C11D 9/36* (2006.01)

(52) U.S. Cl.
CPC ..................... *C11D 1/92* (2013.01)

(58) Field of Classification Search
CPC ........... C11D 1/92; C11D 3/162; C11D 3/373; C11D 3/3742; C11D 9/225; C11D 9/36; C11D 11/0023; C11D 17/0091
See application file for complete search history.

(56) References Cited

U.S. PATENT DOCUMENTS

| | | | |
|---|---|---|---|
| 4,013,574 A | 3/1977 | Leikhim | |
| 4,152,165 A | 5/1979 | Langager | |
| 4,338,377 A | 7/1982 | Beck | |
| 4,416,794 A | 11/1983 | Barrat | |
| 4,624,713 A | 11/1986 | Morganson | |
| 4,711,738 A | 12/1987 | Copeland | |
| 4,846,989 A | 7/1989 | Killa | |
| 5,714,453 A | 2/1998 | Neumiller | |
| 5,726,139 A | 3/1998 | Willey | |
| 5,936,703 A * | 8/1999 | Miyazaki | C03C 17/30 106/287.11 |
| 6,210,600 B1 | 4/2001 | Zhou | |
| 6,740,626 B2 | 5/2004 | Neumiller | |
| 2001/0018535 A1 | 8/2001 | Klein | |
| 2004/0194800 A1 | 10/2004 | Chang | |
| 2004/0266649 A1 | 12/2004 | Thekkekandam | |
| 2005/0003979 A1 | 1/2005 | Lentsch | |
| 2007/0299177 A1 | 12/2007 | Serobian | |
| 2009/0298736 A1 | 12/2009 | Kessler | |
| 2009/0305934 A1 | 12/2009 | Creamer | |
| 2010/0006006 A1 | 1/2010 | Bohlander | |
| 2010/0081596 A1 | 4/2010 | Rong | |
| 2011/0126858 A1 | 6/2011 | Song | |
| 2012/0232301 A1* | 9/2012 | Chen | C07F 7/184 556/418 |
| 2013/0045909 A1 | 2/2013 | Silvernail | |
| 2013/0256583 A1* | 10/2013 | Schlenoff | H01F 1/42 252/62.57 |
| 2014/0060583 A1 | 3/2014 | Riddle | |
| 2014/0147387 A1* | 5/2014 | Butts | A61K 49/0428 424/9.1 |

FOREIGN PATENT DOCUMENTS

| | | |
|---|---|---|
| EP | 2 194 115 A2 | 6/2010 |
| WO | WO 2007/146680 A1 | 12/2007 |
| WO | WO 2009/119690 A1 | 10/2009 |
| WO | 2011084661 * | 7/2011 |
| WO | WO 2011/084661 A2 | 7/2011 |
| WO | WO 2013/102099 | 7/2013 |

OTHER PUBLICATIONS

U.S. Appl. No. 61/416,938, "Articles with Rewritable Surfaces and Methods for Making and Using Same", filed Nov. 24, 2010, now expired.
Kirk-Othmer, *Kirk-Othmer Encyclopedia of Chemical Technology*, Third Edition, vol. 8, New York, NY, 1984, pp. 900-912.

* cited by examiner

*Primary Examiner* — Charles Boyer
(74) *Attorney, Agent, or Firm* — Emily M. Van Vliet; David Patchett

(57) ABSTRACT

Compositions and uses thereof to clean and/or rinse tableware, wherein the compositions include a sulfonated silane.

40 Claims, No Drawings

DETERGENT AND RINSE-AID COMPOSITIONS CONTAINING A ZWITTERIONIC SULFONATED SILANE AND METHODS OF USING

CROSS REFERENCE TO RELATED APPLICATIONS

This application is a national stage filing which claims priority to U.S. Provisional Patent Application No. 61/916,689, filed Dec. 16, 2013, the disclosure of which is incorporated by reference in its entirety herein.

BACKGROUND

The cleaning process of preparing tableware for repeated use is typically referred to as "dish washing" or "ware washing." Typically, the tableware cleaning process is focused on removing food soil and creating a hygienic surface so that the tableware may be re-used. In addition to the basic cleaning and hygienic objectives often the cleaning process also includes an aesthetic objective, such as imparting a uniform appearance with shine and clarity. The aesthetic component is particularly important on clear glass items such as drinking glasses and crystal stemware.

The dish washing process is a ubiquitous part of modern life often following every consumed meal and therefore occurring both in households and commercial enterprises that serve meals. Although the dish washing process is essential, it does require effort including manual labor, water, and some type of chemical detergent. In commercial enterprises, such as restaurants, and food service where volume and repetitive use is quite high and financial targets are imperative, the costs associated with dish washing, particularly labor, chemicals, and water need to be minimized in relation to the basic hygienic and desired aesthetic results. A common method for addressing the dish washing costs in commercial enterprises is to automate the process typically involving a dish machine to wash multiple pieces of tableware at a time.

Particular challenges commercial enterprises face are removing oils, baked on grease and food soils from general tableware, as well as lipstick from drinking glasses and stem ware. Often when tableware is soiled with these types of soil, one cycle of the automated process, i.e., running through the dish machine, is not sufficient to create the basic hygienic and aesthetic requirements of the commercial enterprise. In these cases the items that are in an undesirable state after one cycle of the automated process have to be sorted from the "clean" dishes and are either re-run through the process or manually treated. In either case additional labor, chemicals, and water are used to achieve the desired result, driving up the costs and environmental impact of preparing the tableware for re-use. Additionally, because the sorting of suitable or unsuitable tableware after the automated process is largely subjective and relies on human observations, the opportunity for an unsuitable piece of tableware to be placed in front of a customer exists.

SUMMARY

The present disclosure addresses these challenges. The present disclosure is directed to compositions and methods for washing and/or rinsing tableware. The compositions include a sulfonated silane, preferably a zwitterionic sulfonated silane.

Advantageously, in certain embodiments, compositions of the present disclosure include components that not only remove soils and impart good aesthetics, but also make tableware easier to subsequently clean. Specifically, certain preferred compositions described herein cause soils not to stick to tableware which has been previously treated and thus reduce labor, chemical usage, and water as well insure better and more consistent aesthetic results in the dish washing process.

In one embodiment, the present disclosure provides a method of washing and/or rinsing tableware, wherein the method includes: providing tableware; and contacting the tableware with a composition comprising a sulfonated silane.

In certain embodiments, the method includes providing dirty tableware, washing the dirty tableware, and optionally rinsing the tableware to provide a protective layer.

In certain embodiments, the method includes providing clean tableware and rinsing the clean tableware to provide a protective layer.

In certain embodiments of the present disclosure, a rinse-aid composition is provided. In one embodiment, the rinse-aid composition includes a sulfonated silane, a metal salt, and a surfactant. In another embodiment, the rinse-aid composition includes a sulfonated silane, a surfactant, and a solidification agent.

In certain embodiments of the present disclosure, a tableware detergent composition is provided. In one embodiment, the tableware detergent is a solid tableware detergent composition that includes a sulfonated silane, a surfactant, an alkaline source, and a solidification agent.

DEFINITIONS

The term "tableware" includes dishes (e.g., plates, bowls, cups, serving dishes, etc.), cutlery (e.g., spoons, forks, knives, serving utensils), and glassware (e.g., stemware).

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably.

As used herein, the term "or" is generally employed in its sense including "and/or" unless the content clearly dictates otherwise. The term "and/or" means one or all of the listed elements or a combination of any two or more of the listed elements.

As used herein, all numbers are assumed to be modified by the term "about" and in certain embodiments by the term "exactly." Notwithstanding that the numerical ranges and parameters setting forth the broad scope of the invention are approximations, the numerical values set forth in the specific examples are reported as precisely as possible. All numerical values, however, inherently contain certain errors necessarily resulting from the standard deviation found in their respective testing measurements.

Also herein, the recitations of numerical ranges by endpoints include all numbers subsumed within that range (e.g., 1 to 5 includes 1, 1.5, 2, 2.75, 3, 3.80, 4, 5, etc.).

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one Y group is present in a formula, each Y group is independently selected. Furthermore, subgroups contained within these groups are also independently selected. For example, when each Y group contains an R, then each R is also independently selected.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" is a divalent alkyl group. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.). A group that may be the same or different is referred to as being "independently" something.

In the context of a polymer, "hydrophilic" is used to refer to a polymer that contains polar or charged functional groups, rendering them soluble in water. In the context of a surface, a "hydrophilic" surface is one that is wet by aqueous solutions, and does not express whether or not the layer absorbs aqueous solutions. Surfaces on which drops of water or aqueous solutions exhibit a static water contact angle of less than 40° are referred to as "hydrophilic". Hydrophobic substrates have a water contact angle of 40° or greater.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure is directed to compositions and methods for washing and/or rinsing tableware. The compositions may be rinse-aid compositions or tableware detergent compositions.

The compositions include a sulfonated silane. Certain compositions also include a surfactant, a metal salt, a hydrophilic polymer, a solidification agent, and/or an alkaline source.

In one embodiment, the present disclosure provides a method of washing and/or rinsing tableware, wherein the method includes: providing tableware; and contacting the tableware with a composition comprising a sulfonated silane.

In certain embodiments, the method includes providing dirty tableware, washing the dirty tableware, and optionally rinsing the tableware to provide a protective layer. A preferred cleaning process includes pre-rinsing dirty tableware, washing the pre-rinsed tableware, sanitizing (e.g., by heat and/or chemical treatment), and/or rinsing the detergent-washed compositions. The sanitizing and rinsing (of the detergent washed tableware) steps may be carried out in either order.

In certain embodiments, the method includes providing clean tableware and rinsing the clean tableware to provide a protective layer. In such embodiments, the composition is referred to as a rinse-aid composition.

Compositions of the present disclosure are preferably applied by aqueous solution to a piece of tableware, typically imparting at least a monolayer thickness of the sulfonated silane. This is particularly beneficial for siliceous based tableware (e.g., glassware and ceramics). As used herein, "at least a monolayer" includes a monolayer or a thicker layer of molecules, covalently bonded (e.g., through siloxane bonds) to the surface, wherein such molecules are derived from the sulfonate-functional compound. If the sulfonate-functional compound includes dimers, trimers, or other oligomers of individual molecules, then "at least a monolayer" would include a monolayer of such dimers, trimers, or other oligomers, or a mixture of such oligomers with monomers.

Typically, the coating is no greater than 10 microns thick, and preferably no greater than 1 micron thick, as measured using an ellipsometer such as a Gaertner Scientific Corp Model No. L115C.

In certain embodiments, a dried coating of the composition on a substrate surface has a contact angle of less than 40 degrees, or less than 30 degrees, or less than 20 degrees determined by ASTM D7334-08.

Sulfonated Silanes

Sulfonated silanes (i.e., sulfonate-functional silane compounds) have an alkoxysilane- and/or silanol-functional group (which can bond to a substrate surface) and a sulfonate group ($SO_3^-$) (which can render a substrate surface hydrophilic). For certain embodiments, the sulfonated silanes are zwitterionic and for certain embodiments, they are non-zwitterionic.

Examples include non-zwitterionic sulfonate-functional silane compounds such as those disclosed in U.S. Pat. No. 4,152,165 (Langager et al.) and U.S. Pat. No. 4,338,377 (Beck et al.).

In certain embodiments, the non-zwitterionic sulfonate-containing compounds used in the solutions and compositions of the present disclosure have the following Formula (I):

$$[(MO)(Q^1)_n Si(XCH_2SO_3^-)_{3-n}]Y_{2/nr}^{+r} \quad (I)$$

wherein:

each $Q^1$ is independently selected from hydroxyl, alkyl groups containing from 1 to 4 carbon atoms and alkoxy groups containing from 1 to 4 carbon atoms;

M is selected from hydrogen, alkali metals, and organic cations of strong organic bases having an average molecular weight of less than 150 and a pKa of greater than 11;

X is an organic linking group;

Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+N(CH_3)_4$, $^+N(CH_2CH_3)_4$), provided that M is hydrogen when Y is selected from hydrogen, alkaline earth metals and organic cations of said protonated weak bases;

r is equal to the valence of Y; and n is 1 or 2.

Preferably, the non-zwitterionic compound of Formula (I) is an alkoxysilane compound (e.g., wherein $Q^1$ is an alkoxy group containing from 1 to 4 carbon atoms).

The weight percentage of oxygen in these compounds of Formula (I) is at least 30%, or at least 40%. Preferably, it is in the range of 45% to 55%. The weight percentage of silicon in these compounds is no greater than 15%. Each of these percentages is based on the weight of the compound in the water-free acid form.

In certain embodiments, the organic linking group X of Formula (I) may be selected from alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups. Preferably, X is selected from alkylene groups, hydroxy-substituted alkylene groups and hydroxy-substituted mono-oxa alkylene groups.

Suitable examples of non-zwitterionic compounds of Formula (I) are described in U.S. Pat. No. 4,152,165 (Langager et al.) and U.S. Pat. No. 4,338,377 (Beck et al.), and include, for example, the following:

$(HO)_3Si-CH_2CH_2CH_2-O-CH_2-CH(OH)-CH_2SO_3^-H^+$;

$(HO)_3Si-CH_2CH(OH)-CH_2SO_3^-H^+$;

$(HO)_3Si-CH_2CH_2CH_2SO_3H^+$;

$(HO)_3Si-C_6H_4-CH_2CH_2SO_3H^+$;

$(HO)_2Si-[CH_2CH_2SO_3H^+]_2$;

$(HO)-Si(CH_3)_2-CH_2CH_2SO_3H+$;

$(NaO)(HO)_2Si-CH_2CH_2CH_2-O-CH_2-CH(OH)-CH_2SO_3^-Na^+$; and $(HO)_3Si-CH_2CH_2SO_3^-K^+$.

Examples of zwitterionic sulfonate-functional silane compounds include those disclosed in U.S. Pat. No. 5,936,703 (Miyazaki et al.) and International Publication Nos. WO 2007/146680 and WO 2009/119690.

In certain embodiments, the zwitterionic sulfonate-functional silane compounds used in the present disclosure have the following Formula (II) wherein:

$$(R^1O)_p-Si(Q^2)_q-W-N^+(R^2)(R^3)-(CH_2)_m-SO_3^- \quad (II)$$

wherein:

each $R^1$ is independently a hydrogen, methyl group, or ethyl group;

each $Q^2$ is independently selected from hydroxyl, alkyl groups containing from 1 to 4 carbon atoms and alkoxy groups containing from 1 to 4 carbon atoms;

each $R^2$ and $R^3$ is independently a saturated or unsaturated, straight chain, branched, or cyclic organic group, which may be joined together, optionally with atoms of the group W, to form a ring;

W is an organic linking group;

p and m are integers of 1 to 3;

q is 0 or 1; and p+q=3.

In certain embodiments, the organic linking group W of Formula (II) may be selected from saturated or unsaturated, straight chain, branched, or cyclic organic groups. The linking group W is preferably an alkylene group, which may include carbonyl groups, urethane groups, urea groups, heteroatoms such as oxygen, nitrogen, and sulfur, and combinations thereof. Examples of suitable linking groups W include alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups.

Suitable examples of zwitterionic compounds of Formula (II) are described in U.S. Pat. No. 5,936,703 (Miyazaki et al.) and International Publication Nos. WO 2007/146680 and WO 2009/119690, and include the following zwitterionic functional groups ($-W-N^+(R^3)(R^4)-(CH_2)_m-SO_3^-$):

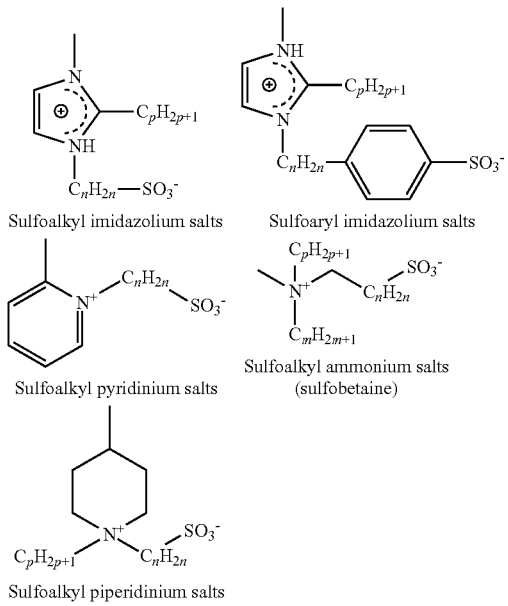

Sulfoalkyl imidazolium salts

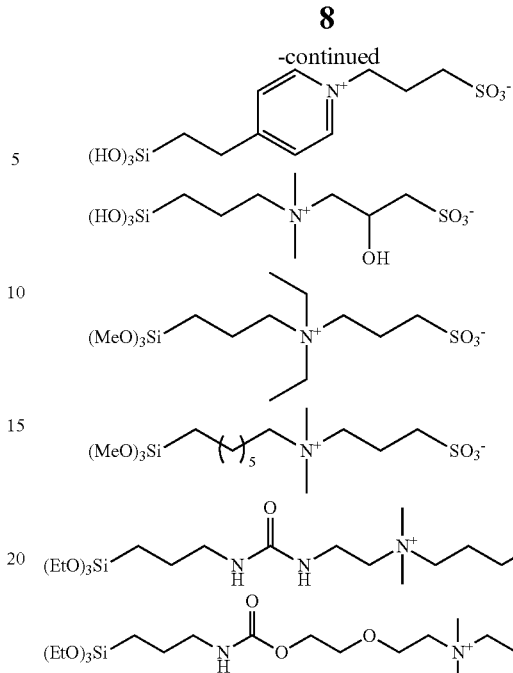

Sulfoaryl imidazolium salts

Sulfoalkyl pyridinium salts

Sulfoalkyl ammonium salts (sulfobetaine)

Sulfoalkyl piperidinium salts

In certain embodiments, the sulfonate-functional silane compounds used in the present disclosure have the following Formula (III) wherein:

$$(R^1O)_p—Si(Q^2)_q\text{-}CH_2CH_2CH_2—N^+(CH_3)_2—(CH_2)_m—SO_3^- \quad (III)$$

wherein:
each $R^1$ is independently a hydrogen, methyl group, or ethyl group;
each $Q^2$ is independently selected from hydroxyl, alkyl groups containing from 1 to 4 carbon atoms and alkoxy groups containing from 1 to 4 carbon atoms; p and m are integers of 1 to 3;
q is 0 or 1; and
p+q=3.

Suitable examples of zwitterionic compounds of Formula (III) are described in U.S. Pat. No. 5,936,703 (Miyazaki et al.), including, for example:

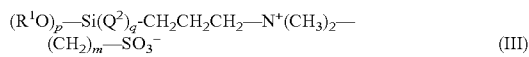

$(CH_3O)_3Si—CH_2CH_2CH_2—N^+(CH_3)_2—CH_2CH_2CH_2—SO_3^-$; and $(CH_3CH_2O)_2Si(CH_3)—CH_2CH_2CH_2—N^+(CH_3)_2—CH_2CH_2CH_2—SO_3^-$.

Other examples of suitable zwitterionic compounds, which may be made using standard techniques that are exemplified in the Examples Section, include the following:

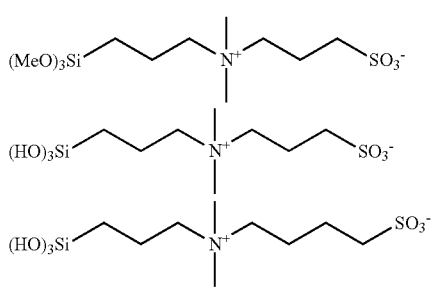

Preferred examples of suitable sulfonate-functional silane compounds for use in the present disclosure are described in the Experimental Section. A particularly preferred zwitterionic sulfonate-functional silane is:

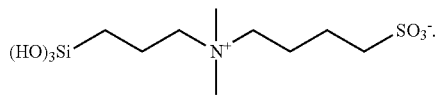

Compositions of the present disclosure typically include a sulfonate-functional silane compound in an amount of at least 0.01 weight percent (wt-%), and often at least 1 wt-%, based on the total weight of the composition. The compositions of the present disclosure typically include a sulfonate-functional silane compound in an amount of no greater than 20 wt-%, and often no greater than 5 wt-%, based on the total weight of the composition.

Metal Salts

Suitable metal salts are those typically used in detergents and rinse additives to inhibit corrosion.

Preferred such compounds include a source of aluminum ion, a source of zinc ion, or a combination thereof.

The source of aluminum ion and the source of zinc ion provide aluminum ion and zinc ion, respectively, when a composition of the present disclosure is provided in the form of a use solution. Anything that provides an aluminum ion in a use solution may be referred to as a source of aluminum ion, and anything that provides a zinc ion when provided in a use solution may be referred to as a source of zinc ion. It is not necessary for the source of aluminum ion and/or the source of zinc ion to react to form the aluminum ion and/or the zinc ion. It should be understood that aluminum ion may be considered a source of aluminum ion, and zinc ion may be considered a source of zinc ion. The source of aluminum ion and the source of zinc ion may be provided as organic salts, inorganic salts, and mixtures thereof.

Suitable sources of aluminum ion include aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, aluminum zinc sulfate, and aluminum phosphate.

Suitable sources of zinc ion include zinc salts such as zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluosilicate, and zinc salicylate.

Other suitable examples are described in U.S. Pat. Pub. No. 2005/0003979.

One or more metal salts are included in compositions of the present disclosure in an amount sufficient to provide a use solution that exhibits a rate of corrosion and/or etching of glass that is less than the rate of corrosion and/or etching of glass for an otherwise identical use solution except for the absence of the corrosion inhibitor.

In some embodiments, compositions of the present disclosure, particularly rinse-aid compositions, include a metal salt, in an amount of at least 0.001 wt-%, or at least 0.1 wt-%, or at least 1 wt-%, or at least 10 wt-%, based on the total weight of the composition. In some embodiments, compositions of the present disclosure, particularly rinse-aid compositions, include a metal salt in an amount of up to 20 wt-%, or up to 15 wt-%, or up to 10 wt-%, or up to 5 wt-%, based on the total weight of the composition.

Surfactants

Compositions of the present disclosure, particularly rinse-aid compositions, can also include one or more surfactants.

A variety of surfactants may be used in a composition, such as anionic, nonionic, cationic, and zwitterionic surfactants. Suitable surfactants that may be used are commercially available from a number of sources. For a discussion of surfactants, see Kirk-Othmer, Encyclopedia of Chemical Technology, Third Edition, volume 8, pages 900-912.

Nonionic surfactants include, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the tradename PLURONIC (BASF-Wyandotte), and the like; and other like nonionic compounds. Silicone surfactants such as those available under the tradename ABIL B8852 can also be used.

Preferred surfactants re any of a broad variety of nonionic ethylene oxide (EO) containing surfactants. Many nonionic ethylene oxide derivative surfactants are water soluble and have cloud points below the intended use temperature of the compositions of the present disclosure. In addition, where the composition is preferred to be biodegradable, the defoamers are also selected to be biodegradable.

Some examples of ethylene oxide derivative surfactants that may be used in compositions of the present disclosure include polyoxyethylene-polyoxypropylene block copolymers, alcohol alkoxylates, low molecular weight EO containing surfactants, or the like, or derivatives thereof. Some examples of polyoxyethylene-polyoxypropylene block copolymers include those having the following formulae:

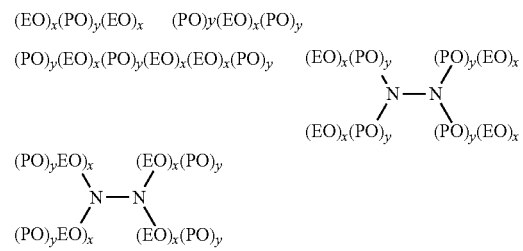

wherein EO represents an ethylene oxide group, PO represents a propylene oxide group, and x and y reflect the average molecular proportion of each alkylene oxide monomer in the overall block copolymer composition. In some embodiments, x is in the range of 10 to 130, y is in the range of 15 to 70, and x plus y is in the range of 25 to 200. It should be understood that each x and y in a molecule may be different. In some embodiments, the total polyoxyethylene component of the block copolymer may be at least 20 mole percent (mol-%) of the block copolymer and in some embodiments, at least 30 mol-% of the block copolymer. In some embodiments, the material may have a molecular weight greater than 400, and in some embodiments, greater than 500. For example, in some embodiments, the material may have a molecular weight in the range of 500 to 7000 or more, or in the range of 950 to 4000 or more, or in the range of 1000 to 3100 or more, or in hie range of 2100 to 6700 or more.

Although the exemplary polyoxyethylene-polyoxypropylene block copolymer structures provided above have 3-8 blocks, it should be appreciated that the nonionic block copolymer surfactants can include more or less than 3 or 8 blocks. In addition, the nonionic block copolymer surfactants can include additional repeating units such as butylene oxide repeating units. Furthermore, the nonionic block copolymer surfactants that may be used according to the invention may be characterized hetero-polyoxyethylene-polyoxypropylene block copolymers. Some examples of suitable block copolymer surfactants include commercial products such as those surfactants available under the tradenames PLURONIC and TETRONIC from BASF. For example, PLURONIC 25-R4 is one example of a useful block copolymer surfactant commercially available from BASF, that is biodegradable and GRAS (generally recognized as safe).

Suitable anionic surfactants include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Exemplary anionic surfactants include sodium alkylarylsulfonate, alpha-olefinsulfonate, and fatty alcohol sulfates.

Suitable cationic surfactants include, for example, amities such as primary, secondary and tertiary monoamines with $C_{18}$ alkyl or alkenyl chains, ethoxylated alkylamines; alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, a naphthylene-substituted quaternary ammonium chloride such as dimethyl-1-naphthylmethylammonium chloride, and the like. The cationic surfactant may be used to provide sanitizing properties.

Suitable zwitterionic surfactants include, for example, betaines, imidazolines, and propinates.

In some embodiments, compositions of the present disclosure, particularly rinse-aid compositions, include a surfactant in an amount of at least 0.1 wt-%, or at least 1 wt-%, or at least 5 wt-%, or at least 10 wt-%, based on the total weight of the composition. In some embodiments, compositions of the present disclosure, particularly rinse-aid compositions, include a surfactant in an amount of up to 50 wt-%, or up to 40 wt-%, or up to 30 wt-%, or up to 20 wt-%, based on the total weight of the composition.

Hydrophilic Polymers

Certain compositions of the present disclosure, particularly rinse-aid compositions, can include one or more hydrophilic polymers.

Suitable hydrophilic polymers include polycarboxylates and polysulfonates. Some examples of polymeric polycarboxylates, and polysulfonates are those suitable for use as sequestering agents. Such polymers include, for example, those having pendant carboxylate (—$CO_2$) or (—$SO_3$) groups.

Other suitable examples of hydrophilic polymers include, but are not limited to, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamidecopolymers, hydrolyzed polyacrylonitrile, hydrolyzed polymethacrylonitrile, hydrolyzed acrylonitrile-methacrylonitrile copolymers, acrylic acid-co-acrylamido-2 methyl propane sulfonate, acrylic acid, and the like.

In some embodiments, compositions of the present disclosure, particularly rinse-aid compositions, include a hydrophilic polymer in an amount of at least 0.05 wt-%, or at least 0.5 wt-%, or at least 1.5 wt-%, or at least 3 wt-%, based on the total weight of the composition. In some embodiments, compositions of the present disclosure, particularly rinse-aid compositions, include a hydrophilic polymer in an amount of up to 30 wt-%, or up to 20 wt-%, or up to 10 wt-%, or up to 5 wt-%, based on the total weight of the composition.

Optional Sanitizers/Antimicrobial Agents

Compositions of the present disclosure, particularly the rinse-aid compositions, can optionally include a sanitizing agent. Sanitizing agents, also known as antimicrobial agents, are chemical compositions that may be used in a solid functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

Active oxygen compounds may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action. Nonetheless, some embodiments incorporate additional antimicrobial agents.

An active oxygen compound may be inorganic or organic, or may be a mixture thereof. Some examples of active oxygen compounds include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like.

The given antimicrobial agent, depending on chemical composition and concentration, may simply limit further proliferation of numbers of the microbe(s) or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that may be contacted with a variety of surfaces resulting in prevention of growth or the killing of a portion of the microbial population. A three log reduction of the microbial population results in a sanitizer composition. The antimicrobial agent may be encapsulated, for example, to improve its stability.

Some examples of common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties. Example antimicrobial agents include a blend of methylchloroisothiazolinone and methylisothiazolinone, available from Rohm and Haas under the tradename KATHON.

In some embodiments, compositions of the present disclosure include an antimicrobial agent in an amount of at least 0.01 wt-%, or at least 0.1 wt-%, or at least 1 wt-%, or at least 3 wt-%, based on the total weight of the composition. In some embodiments, compositions of the present disclosure include an antimicrobial agent in an amount of up to 15 wt-%, or up to 10 wt-%, or up to wt-%, or up to 5 wt-%, based on the total weight of the composition.

Alkaline Sources

Compositions of the present disclosure may include an effective amount of one or more alkaline sources to enhance cleaning of a substrate and improve soil removal performance of the composition. In general, an effective amount of one or more alkaline sources should be considered as an amount that provides a use solution having a pH of at least about 8. When the use solution has a pH of between about 8 and about 10, it may be considered mildly alkaline, and when the pH is greater than about 12, the use solution may be considered caustic. In general, it is desirable to provide a use solution as a mildly alkaline cleaning composition.

Compositions of the present disclosure can include a metal carbonate and/or an alkali metal hydroxide. Exemplary metal carbonates that may be used include, for example, sodium or potassium carbonate, bicarbonate, sesquicarbonate, mixtures thereof. Exemplary alkali metal hydroxides that may be used include, for example, sodium or potassium hydroxide. An alkali metal hydroxide may be added to the composition in the form of solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 50 wt-% and a 73 wt-% solution.

Solidification Agents

In certain embodiments, compositions of the present disclosure include one or more solidification agents.

In certain embodiments, compositions of the present disclosure that are in the form of rinse-aid compositions may include an effective amount of a combination of sodium sulfate and urea for solidification. In general, an effective amount of sodium sulfate and urea is considered an amount that acts with or without other materials to solidify the rinse aid composition. Typically, the combined amount of sodium sulfate and urea in a solid rinse aid composition is in a range of 18 wt-% to 70 wt-% of the solid rinse-aid composition, with 3 wt-% to 24 wt-% sodium sulfate, and 15 wt-% to 50 wt-% urea. In other embodiments, the combined amount of sodium sulfate and urea is in a range of 10 wt-% to 50 wt-%, with 5 wt-% to 18 wt-% sodium sulfate and 5 wt-% to 45 wt-% urea. In some instances, the combined amount of sodium sulfate and urea is in a range of 20 wt-% to 37 wt-% of the rinse-aid composition, with 10 wt-% to 16 wt-% sodium sulfate and 16 wt-% to 27 wt-% urea.

Generally, a rinse-aid composition hardens into solid form due to the chemical reaction of the ingredients with the sodium sulfate and urea. The solidification process may last from a few minutes to about four hours, depending, for example, on the size of the cast or extruded composition, the ingredients of the composition, the temperature of the composition, and other like factors. Typically, the rinse aid composition of the present disclosure exhibits extended mix time capability. Often, the cast or extruded composition "sets up" or begins to harden to a solid form within 1 minute to about 3 hours. For example, the cast or extruded composition "sets up" or begins to harden to a solid form within a range of 1 minute to 2 hours. In some instances, the cast or extruded composition "sets up" or begins to harden to a solid form with a range of 1 minute to about 20 minutes In certain embodiments, compositions of the present disclosure that are in the form of detergent compositions include condensed phosphates, or citrates such as sodium citrate. Condensed phosphates include sodium and potassium orthophosphate, sodium and potassium pyrophosphate, sodium tripolyphosphate, sodium hexametaphosphate, and the like. A condensed phosphate may assist in solidification of a composition by fixing the free water present in the composition as water of hydration. The condensed phosphate and citrate compounds also act as emulsifying agents when the detergent compositions are diluted. These solidification agent(s) can also be up to 70% of the composition.

Other Optional Additives

Compositions of the present disclosure may also include other additives, including conventional additives such as chelating/sequestering agents, bleaching agents, detergent builders or fillers, hardening agents or solubility modifiers, defoamers, anti-redeposition agents, threshold agents, aesthetic enhancing agents (i.e., dye, perfume), and the like. Adjuvants and other additive ingredients will vary according to the type of composition being manufactured.

In certain embodiments, nonpolymeric organic acids with one or more carboxylic acid moieties per molecule may be included in compositions of the present disclosure. Examples include sorbic acid, benzoicacid, ascorbic acid, erythorbic acid, citric acid, etc. Small molecule acids such as this may be added to adjust the pH to make acidic, and in some cases to protect glass.

In certain embodiments, the sulfonate-functional coating composition further includes a tetraalkoxysilane (e.g., tetraethylorthosilicate (TEOS)), oligomers thereof, such as alkyl polysilicates (e.g., poly(diethoxysiloxane)), lithium silicate, sodium silicate, potassium silicate, or combinations thereof, which can provide enhanced durability. In some embodiments, the amount of such coupling agent included in the coating composition should be limited in order to prevent undesired coating build up on the tableware. The optimal amount of coupling agent is determined experimentally and is dependent on the coupling agent's identity, molecular weight and refractive index.

It should be understood that these additives are optional and need not be included in compositions of the present disclosure. When they are included, they may be included in an amount that provides for the effectiveness of the particular type of component.

Compositions of the present disclosure may also include alcohol, water, or hydroalcoholic solutions (i.e., alcohol and/or water). Typically, such alcohols are lower alcohols (e.g., $C_1$ to $C_8$ alcohols, and more typically $C_1$ to $C_4$ alcohols), such as methanol, ethanol, propanol, 2-propanol, etc. Preferably, the sulfonate-functional coating compositions are aqueous solutions. As it is used herein, the term "aqueous solution" refers to solutions containing water. Such solutions may employ water as the only solvent or they may employ combinations of water and organic solvents such as alcohol and acetone. Organic solvents may also be included in the hydrophilic treatment compositions so as to improve their freeze-thaw stability. Typically, the solvents are present in an amount up to 50% by weight of the compositions and preferably in the range of 5-50% by weight of the compositions.

Compositions of the present disclosure may be acidic, basic, or neutral. Compositions of the present disclosure containing sulfonate-functional zwitterionic compounds are preferably neutral.

Forms of Compositions

Compositions of the present disclosure may be provided in a variety of viscosities. Thus, for example, the viscosity may vary from a water-like thinness to a paste-like heaviness. They may also be provided in the form of gels. Also, they may be in solid form.

Rinse-aid compositions may be dispensed as a concentrate or as a use solution. In addition, a rinse-aid concentrate may be provided in a solid form or in a liquid form. In general, it is expected that the concentrate will be diluted with water to provide the use solution that is then supplied to the surface of a substrate. In some embodiments, the aqueous use solution may contain about 2,000 parts per million (ppm) or less active materials, or about 1,000 ppm or less active material, or in the range of about 10 ppm to about 500 ppm of active materials, or in the range of about 10 to about 300 ppm, or in the range of about 10 to 200 ppm. The use solution may be applied to the substrate during a rinse application, for example, during a rinse cycle, for example, in a warewashing machine, a car wash application, or the like. In some embodiments, formation of a use solution can occur from a rinse-aid composition installed in a cleaning machine, for example onto a dish rack. The rinse-aid composition may be diluted and dispensed from a dispenser mounted on or in the machine or from a separate dispenser that is mounted separately but cooperatively with the dish machine.

Solid rinse-aid compositions may be incorporated into a packaging system or receptacle. The packaging receptacle or container may be rigid or flexible, and include any material suitable for containing the compositions produced, as for example glass, metal, plastic film or sheet, cardboard, cardboard composites, paper, or the like. Rinse-aid compositions may be allowed to solidify in the packaging or may be packaged after formation of the solids in commonly available packaging and sent to distribution center before shipment to the consumer.

Detergent compositions typically are formulated as concentrates. Detergent concentrates can take the form of liquids, pastes, gels, or solids. Detergent concentrates are typically diluted with water immediately prior to use, however, in some cases dilution occurs upon use, i.e., small amount of concentrate added to a large volume of water already existing in a dish machine or dish sink. Pre-use dilution typically occurs by utilizing a dispensing system to dissolve a portion of a solid concentrate with a stream of water to create a use solution that is directly injected in to an automatic dish machine at the appropriate time in the washing process. Diluted use solutions of concentrated liquid detergents can also be delivered to dish machines utilizing a dispenser equipped with an aspirator type dispenser. Alternately, concentrated detergents may be supplied to a dish machine or sink directly using devices such as a peristaltic pump. The detergent composition may be diluted and dispensed from a dispenser mounted on or in the machine or from a separate dispenser that is mounted separately but cooperatively with the dish machine. Direct addition of concentrated solids or liquids is often accomplished in commercial enterprises by addition of pre-measured amounts typically in the form of packets or tablets.

The use solutions of detergents are employed in automated dish machines as well as in dish sinks typically referred to as three-compartment sinks. Automatic dish machines typically are either designed for a batch process or a continuous process. Continuous process machines are referred to as "flight machines" where tableware is loaded on one end and a conveyor carries the tableware through continuously operating zones, typically including pre-rinse, detergent, sanitization, and final rinse. Diluted, detergent use solution is continuously delivered to the machine from a dispenser as tableware proceeds through the machine. In a batch process dish machine, after the machine is loaded, the door of the machine is closed signaling the start of the cleaning process and at the appropriate stage the machine activates the detergent dispenser to add the appropriate amount of detergent.

As dishes are cleaned, food soil and excess water dilute the chemical activity in the detergent zone and requires replenishment. The dispenser delivers the appropriate amount of use detergent solution based upon either throughput volume, time, or more typically chemical activity sensing in the detergent zone. Generally the chemical dispenser is operatively coupled to a conductivity probe located in the dish washing machine, when the dispenser senses reduced chemical activity, additional detergent chemistry is added.

Solid detergent compositions may be incorporated into a packaging system or receptacle. The packaging receptacle or container may be rigid or flexible, and include any material suitable for containing the compositions produced, as for example glass, metal, plastic film or sheet, cardboard, cardboard composites, paper, or the like. Detergent compositions may also be allowed to solidify in the packaging or may be packaged after formation of the solids in commonly available packaging and sent to distribution center before shipment to the consumer.

Illustrative Embodiments

1. A method of washing and/or rinsing tableware, the method comprising:
   providing tableware; and
   contacting the tableware with a composition comprising a sulfonated silane.
2. The method of embodiment 1 wherein the sulfonated silane comprises a zwitterionic sulfonated silane.
3. The method of embodiment 2 wherein the zwitterionic sulfonated silane has the following formula (Formula II):

$$(R^1O)_p\text{—}Si(Q^2)_q\text{-W—}N^+(R^2)(R^3)\text{—}(CH_2)_m\text{—}SO_3^- \quad \text{(II)}$$

wherein:
   each $R^1$ is independently a hydrogen, methyl group, or ethyl group;
   each $Q^2$ is independently selected from hydroxyl, alkyl groups containing from 1 to 4 carbon atoms and alkoxy groups containing from 1 to 4 carbon atoms;
   each $R^2$ and $R^3$ is independently a saturated or unsaturated, straight chain, branched, or cyclic organic group, which may be joined together, optionally with atoms of the group W, to form a ring;
   W is an organic linking group;
   p and m are integers of 1 to 3;
   q is 0 or 1; and
   p+q=3.
4. The method of embodiment 3 wherein the zwitterionic sulfonated silane is

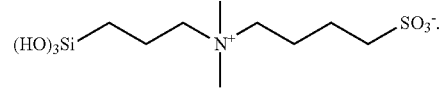

5. The method of any of embodiments 1 through 4 wherein providing tableware comprises providing dirty tableware, and contacting the dirty tableware comprises washing the dirty tableware.
6. The method of embodiment 5 wherein contacting the dirty tableware comprises washing the dirty tableware followed by rinsing the tableware to provide a protective layer.
7. The method of any of embodiments 1 through 6 wherein providing tableware comprises providing clean tableware, and contacting the tableware comprises rinsing the clean tableware to provide a protective layer.
8. The method of any of embodiments 1 through 7 wherein the composition further comprises a metal salt.
9. The method of embodiment 8 wherein the metal salt comprises a combination of a source of aluminum ion and a source of zinc ion.

10. The method of any of embodiments 1 through 9 wherein the composition further comprises a surfactant.

11. The method of embodiment 10 wherein the surfactant is a nonionic ene oxide containing surfactant.

12. The method of any of embodiments 1 through 11 wherein the composition further comprises a hydrophilic polymer.

13. The method of embodiment 12 wherein the hydrophilic polymer is a polycarboxylate.

14. The method of any of embodiments 1 through 13 wherein the composition further comprises an alkaline source.

15. The method of embodiment 14 wherein the alkaline source comprises a metal carbonate, an alkali metal hydroxide, or a combination thereof.

16. The method of any of embodiments 1 through 15 wherein the tableware is glassware.

17. The method of any of embodiments 1 through 16 wherein a dried coating of the composition on a substrate surface has a contact angle of less than 40 degrees.

18. A rinse-aid composition comprising:
   a sulfonated silane;
   a metal salt; and
   a surfactant.

19. The composition of embodiment 18 further comprising a hydrophilic polymer.

20. The composition of embodiment 19 wherein the hydrophilic polymer is a polycarboxylate.

21. The composition of any of embodiments 18 through 20 wherein a dried coating of the composition on a substrate surface has a contact angle of less than 40 degrees.

22. The composition of any of embodiments 18 through 20 wherein the sulfonated silane comprises a zwitterionic sulfonated silane.

23. The composition of embodiment 22 wherein the zwitterionic sulfonated silane has the following formula (Formula II):

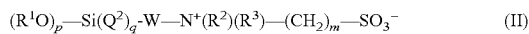  (II)

wherein:
   each $R^1$ is independently a hydrogen, methyl group, or ethyl group;
   each $Q^2$ is independently selected from hydroxyl, alkyl groups containing from 1 to 4 carbon atoms and alkoxy groups containing from 1 to 4 carbon atoms;
   each $R^2$ and $R^3$ is independently a saturated or unsaturated, straight chain, branched, or cyclic organic group, which may be joined together, optionally with atoms of the group W, to form a ring;
   W is an organic linking group;
   p and m are integers of 1 to 3;
   q is 0 or 1; and
   p+q=3.

24. The composition of embodiment 23 wherein the zwitterionic sulfonated silane is

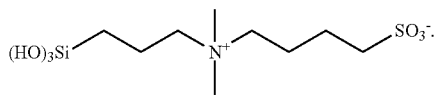

25. The composition of any of embodiments 18 through 24 wherein the metal salt comprises a combination of a source of aluminum ion and a source of zinc ion.

26. The composition of any of embodiments 18 through 25 wherein the surfactant is a nonionic ethylene oxide containing surfactant.

27. The composition of any of embodiments 18 through 26 further comprising a nonpolymeric organic acid with one or more carboxylic acid moieties per molecule.

28. A solid rinse-aid composition comprising:
   a sulfonated silane;
   a surfactant; and
   a solidification agent.

29. The composition of embodiment 28 further comprising a hydrophilic polymer.

30. The composition of embodiment 29 wherein the hydrophilic polymer is a polycarboxylate.

31. The composition of any of embodiments 28 through 30 wherein a dried coating of the composition on a substrate surface has a contact angle of less than 40 degrees.

32. The composition of any of embodiments 28 through 31 wherein the sulfonated silane comprises a zwitterionic sulfonated silane.

33. The composition of embodiment 32 wherein the zwitterionic sulfonated silane has the following formula (Formula II):

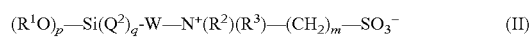  (II)

wherein:
   each $R^1$ is independently a hydrogen, methyl group, or ethyl group;
   each $Q^2$ is independently selected from hydroxyl, alkyl groups containing from 1 to 4 carbon atoms and alkoxy groups containing from 1 to 4 carbon atoms;
   each $R^2$ and $R^3$ is independently a saturated or unsaturated, straight chain, branched, or cyclic organic group, which may be joined together, optionally with atoms of the group W, to form a ring;
   W is an organic linking group;
   p and m are integers of 1 to 3;
   q is 0 or 1; and
   p+q=3.

34. The composition of embodiment 33 wherein the zwitterionic sulfonated silane is

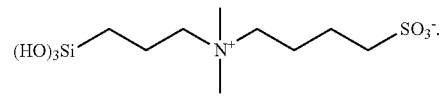

35. The composition of any of embodiments 28 through 34 further comprising a metal salt.

36. The composition of embodiment 35 wherein the metal salt comprises a combination of a source of aluminum ion and a source of zinc ion.

37. The composition of any of embodiments 28 through 36 wherein the surfactant is a nonionic ethylene oxide containing surfactant.

38. The composition of any of embodiments 28 through 37 further comprising a nonpolymeric organic acid with one or more carboxylic acid moieties per molecule.

39. A solid tableware detergent composition comprising:
   a sulfonated silane;
   a surfactant;
   an alkaline source; and
   a solidification agent.

40. The composition of embodiment 39 wherein a dried coating of the composition on a substrate surface has a contact angle of less than 40 degrees.

41. The composition of embodiment 39 or 40 wherein the sulfonated silane comprises a zwitterionic sulfonated silane.
42. The composition of embodiment 41 wherein the zwitterionic sulfonated silane has the following formula (Formula II):

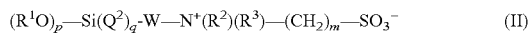

$(R^1O)_p—Si(Q^2)_q-W—N^+(R^2)(R^3)—(CH_2)_m—SO_3^-$ (II)

wherein:
each $R^1$ is independently a hydrogen, methyl group, or ethyl group;
each $Q^2$ is independently selected from hydroxyl, alkyl groups containing from 1 to 4 carbon atoms and alkoxy groups containing from 1 to 4 carbon atoms;
each $R^2$ and $R^3$ is independently a saturated or unsaturated, straight chain, branched, or cyclic organic group, which may be joined together, optionally with atoms of the group W, to form a ring;
W is an organic linking group;
p and m are integers of 1 to 3;
q is 0 or 1; and
p+q=3.
43. The composition of embodiment 42 wherein the zwitterionic sulfonated silane is

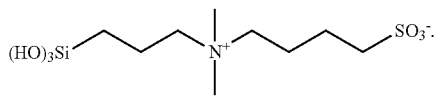

44. The composition of any of embodiments 39 through 43 wherein the alkaline source comprises a metal carbonate, an alkali metal hydroxide, or a combination thereof.
45. The composition of any of embodiments 39 through 44 wherein the surfactant is a nonionic ethylene oxide containing surfactant.

EXAMPLES

Objects and advantages of various embodiments of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.
Materials
Float glass was obtained from Cardinal Glass, Eden Prairie, Minn.
"TOMADOL 91-6" ethoxylated alcohol surfactant was obtained from Air Products and Chemicals, Inc., Allentown, Pa.
Sodium Tripolyphosphate was obtained from Aldrich Chemical, St. Louis, Mo.
Sodium Carbonate was obtained from Aldrich Chemical, St. Louis, Mo.
"Lipstick" is COLORBURST True Red lipstick obtained from Revlon, New York, N.Y.
"Lipstick 2" is Sunset lipstick obtained from Mary Kay, Dallas Tex.
Sodium silicate (98.5%) was obtained from Aldrich Chemical, St. Louis, Mo.
Lithium silicate (grade LSS-75) was obtained from Nissan Chemical, Houston, Tex.
Citric Acid monohydrate was obtained from Alfa Aesar, Ward Hill, Mass.
Zinc Nitrate Hexahydrate was obtained from Aldrich Chemical, St. Louis, Mo.
STEPANOL WA-EXTRA PCK sodium lauryl sulfate was obtained from Stepan, Northfield, Ill.
GLUCOPON 425N decyl glucoside surfactant was obtained from BASF Corporation, Germany
LIQUINOX detergent was obtained from Alconox Inc, White Plains, N.Y.
LIGUITINT BLUE HP colorant was obtained from Milliken and Company, Spartanburg, S.C.
Apple Fragrance was obtained from Sozio Inc. America, Piscataway, N.J.
Isopropanol was obtained from EMD Chemicals, Billerica, Mass.
"Sulfonate Silane" was $(HO)_3Si—CH_2CH_2CH_2—O—CH_2—CH(OH)—CH_2SO_3^-H^+$ and was prepared as described in U.S. Pat. No. 4,338,377 and used as a 22 wt-% solution in water.
"Zwitterionic Silane" was prepared by combining 49.7 g of a 239 mmol solution of 3-(N,N-dimethylaminopropyl)trimethoxysilane, 82.2 g of deionized (DI) water, and 32.6 g of a 239 mmol solution of 1,4-butane sultone in a screw-top jar. The mixture was heated to 75° C., mixed, and allowed to react for 14 hours.

Preparative Composition 1

An Alkaline Dish Washing Detergent Formulation

| Composition 1 | Weight % |
| --- | --- |
| TOMADOL 91-6 (nonionic) | 1 |
| Sodium Tripolyphosphate | 39.00 |
| Sodium silicate (SiO2: Na2O) | 27.5 |
| Sodium Carbonate | 10 |
| Deionized (DI) Water | 22.5 |

Preparative Composition 2

Alkaline Dish Washing Detergent Diluted with DI Water

| Composition 2 | Weight % |
| --- | --- |
| Composition 1 | 5 |
| DI Water | 95.00 |

Preparative Composition 3

Diluted Alkaline Dish Washing Detergent with 1% by Weight Sulfonated Silane

| Composition 3 | Weight % |
| --- | --- |
| Composition 2 | 95 |
| Sulfonated Silane (22% in water) | 5.00 |

Preparative Composition 4

Diluted Alkaline Dish Washing Detergent with 1% by Weight Zwitterionic Silane and Zinc Ions (12 Ppm)

| Composition 4 | Weight % |
| --- | --- |
| Composition 2 | 98 |
| Zwitterionic Silane (50%) in water | 2.00 |
| Zn Nitrate Hexahydrate | 0.0012 |

Preparative Composition 5

Concentrated Acid Rinse-Aid Solution

| Composition 5 | Weight % |
| --- | --- |
| TOMADOL 91-6 (Nonionic) | 13.5 |
| Citric Acid | 17.50 |
| DI Water | 59 |

Preparative Composition 6

Diluted Acid Rinse-Aid Solution

| Composition 6 | Weight % |
| --- | --- |
| Composition 1 | 5 |
| DI Water | 95.00 |

Preparative Composition 7

Diluted Acid Rinse Aid Solution with 1% by Weight Zwitterionic Silane

| Composition 7 | Weight % |
| --- | --- |
| Composition 1 | 5 |
| Zwitterionic Silane (50%) in water | 2.00 |
| DI Water | 93 |

Preparative Composition 8

Diluted Acid Rinse Aid Solution with 1% by Weight Zwitterionic Silane and Zinc Ions (12 Ppm)

| Composition 8 | Weight % |
| --- | --- |
| Composition 1 | 5 |
| Zwitterionic Silane (50%) in water | 2.00 |
| Zn Nitrate Hexahydrate | 0.0012 |
| DI Water | 93 |

Preparation of Glass Plates:

Four inch by four inch by one eighth inch thick soda lime float glass plates were used for cleaning evaluations. All plates were new at time of use and soaked in a LIQUINOX and DEIONIZED water solution for 30 minutes then rinsed thoroughly with DEIONIZED water several times to ensure all residue was removed. Plates were never reused. All plates were thoroughly dried via compressed air before use.

Example 1

Two glass plates were completely covered for 15 minutes in Preparative Composition 2. All plates were then dried in a 220° F. oven for five minutes while upright. The plates were then removed and allowed to cool to room temperature before a final rinse under DEIONIZED water for ten seconds to remove any residual build up.

Soil was then applied to the plates. The glasses were coated with a standard greasy food soil made as per ASTMD-4488/CSPA DCC-17 heated to 50° C. and applied via a foam brush in a uniform strip across one half of the plates. Two lines of lipstick were applied in one motion across the other half of the plates. The soils were then allowed to cool and set for 30 minutes prior to cleaning.

Example 2

Two glass plates were completely covered for 15 minutes in Preparative Composition 3. All plates were then dried in a 220° F. oven for five minutes while upright. The plates were then removed and allowed to cool to room temperature before a final rinse under DEIONIZED water for ten seconds to remove any residual build up. Soil was now applied to the plates. The glasses were coated with a standard greasy food soil made as per ASTMD-4488/CSPA DCC-17 heated to 50° C. and applied via a foam brush in a uniform strip across one half of the plates. Two lines of lipstick were applied in one motion across the other half of the plates. The soils were then allowed to cool and set for 30 minutes prior to cleaning.

Example 3

Two glass plates were completely covered for 15 minutes in Preparative Composition 4. All plates were then dried in a 220° F. oven for five minutes while upright. The plates were then removed and allowed to cool to room temperature before a final rinse under DEIONIZED water for ten seconds to remove any residual build up.

Soil was then applied to the plates. The glasses were coated with a standard greasy food soil made as per ASTMD-4488/CSPA DCC-17 heated to 50° C. and applied via a foam brush in a uniform strip across one half of the plates. Two lines of lipstick were applied in one motion across the other half of the plates. The soils were then allowed to cool and set for 30 minutes prior to cleaning.

Example 4

Two glass plates were completely covered for 15 minutes in Preparative Composition 6. All plates were then dried in a 220° F. oven for five minutes while upright. The plates were then removed and allowed to cool to room temperature before a final rinse under DEIONIZED water for ten seconds to remove any residual build up.

Soil was then applied to the plates. The glasses were coated with a standard greasy food soil made as per ASTMD-4488/CSPA DCC-17 heated to 50° C. and applied via a foam brush in a uniform strip across one half of the plates. Two lines of lipstick were applied in one motion across the other half of the plates. The soils were then allowed to cool and set for 30 minutes prior to cleaning.

Example 5

Two glass plates were completely covered for 15 minutes in Preparative Composition 7. All plates were then dried in a 220° F. oven for five minutes while upright. The plates were then removed and allowed to cool to room temperature before a final rinse under DEIONIZED water for ten seconds to remove any residual build up.

Soil was then applied to the plates. The glasses were coated with a standard greasy food soil made as per ASTMD-4488/CSPA DCC-17 heated to 50° C. and applied via a foam brush in a uniform strip across one half of the plates. Two lines of lipstick were applied in one motion across the other half of the plates. The soils were then allowed to cool and set for 30 minutes prior to cleaning.

Example 6

Two glass plates were completely covered for 15 minutes in preparative Composition 8. All plates were then dried in a 220° F. oven for five minutes while upright. The plates were then removed and allowed to cool to room temperature before a final rinse under DEIONIZED water for ten seconds to remove any residual build up.

Soil was then applied to the plates. The glasses were coated with a standard greasy food soil made as per ASTMD-4488/CSPA DCC-17 heated to 50° C. and applied via a foam brush in a uniform strip across one half of the plates. Two lines of lipstick were applied in one motion across the other half of the plates. The soils were then allowed to cool and set for 30 minutes prior to cleaning.

Wash Cycle:

A tabletop dishwashing unit, SPT SD-2201W tabletop dishwasher purchased from Sunpentown International Inc. (Industry, Calif.), was used for the cleaning cycle of all soiled examples. All plates from Examples 1-6 were placed in the SD-2201W tabletop dishwasher purchased from SPT on the same wash rack in the same position tilted at approximately 30 degrees so as to have the soil facing the interior of the washer. Cold water only was introduced into the system and the "pre-rinse" cycle was run for ten minutes without interruption. The plates were then removed and allowed to air dry. After complete drying visual ratings of 0-4 according to the following scale:

0—No Removal
1.0—25% Removal
2.0—50% Removal
3.0—75% Removal
4.0—100% Removal

"0" represented no soil removal and "4" represented complete soil removal with intermediate scoring such as "3.5" or "3.75" allowed to distinguish between soil removal levels. The dishwasher was cleaned after every use by a combination manual scrubbing and removal of filters and rotating arm to remove any gross soil particles. The rinse cycle was then run with the machine empty to remove any chemical residues.

| Example | Food Soil Removal | Lipstick Removal |
|---|---|---|
| 1 | 0.5 | 3.5 |
| 2 | 4 | 4 |
| 3 | 4 | 4 |

-continued

| Example | Food Soil Removal | Lipstick Removal |
|---|---|---|
| 4 | 0 | 0 |
| 5 | 4 | 4 |
| 6 | 3.5 | 4 |

Preparative Example 9

The following concentrated rinse solution was prepared:

| Material | Weight % Added |
|---|---|
| Deionized Water | 65.69 |
| Stepanol WA-Extra PCK | 7 |
| Isopropyl Alcohol | 5 |
| Glucopon 425N | 15 |
| CP Glycerin | 0.5 |
| TOMADOL 91-6 | 6 |
| Apple Fragrance A62860 | 0.08 |
| Liquitint Blue HP | 0.01 |

Preparative Example 10

The following concentrated rinse solution was prepared:

| Material | Weight % Added |
|---|---|
| Deionized Water | 55.89 |
| Lithium Silicate (22%) | 6.8 |
| Zwitterionic silane (50%) | 3 |
| Stepanol WA-Extra PCK | 7 |
| Isopropyl Alcohol | 5 |
| Glucopon 425N | 15 |
| CP Glycerin | 0.5 |
| TOMADOL 91-6 | 6 |
| Apple Fragrance A62860 | 0.08 |
| Liquitint Blue HP | 0.01 |

Preparative Example 11

Preparative Example 9 (18.8 g) was added to a solution of zwitterionic silane (15 g of 50 wt-% solution), and lithium silicate (34 g of 22 wt-% solutions; LSS-75) before dilution with DI water (1500 g).

Preparative Example 12

Preparative Example 10 (18.8 g) was added to deionized (DI) water (1500 g).

Pretreatment and Preparation of Glassware:

HOUDINI Hand-blown, 18 oz, lead-free crystal Cabernet-Style red wine glasses were manufactured by Metrokane (Reno, Nev.). Seven glasses were all placed in a Better Built Model 7000 Turbomatic Jr. dish machine (South Hackensack, N.J.). A 5 minute (min) rinse cycle was performed and then 100 mL of Decon Dri-Contrad powdered dish soap was added to the machine and 1 wash cycle was completed (a wash cycle consists of a 5 min wash phase followed by two 5 min rinse phases). The glasses were then removed and air dried. After air drying the following examples were prepared.

Example 13

Two glasses were dipped in Preparative Example 11, allowed to stand for one minute prior to being placed in a static oven at 140° C. for two minutes to simulate a drying process in an automatic dish machine. The glasses were removed from the oven, allowed to cool to ambient temperature, and then a line of "lipstick 2" was applied around the entire rim of each glass. The glasses were then placed in the Better Built Dish machine and subjected to a 2 min wash cycle utilizing only water.

Example 14

Two glasses were dipped in preparative Example 12, allowed to stand for approximately 1 minute prior to being placed in a static oven at 140° C. for two minutes to simulate a drying process in an automatic dish machine. The glasses were removed from the oven, allowed to cool to ambient temperature, and then a line of "lipstick 2" was applied around the entire rim of the each glass. The glasses were then placed in the Better Built Dish machine and subjected to a 2 min wash cycle utilizing only water.

Comparative Example 15

Control

Three glasses placed in a static oven at 140° C. for two minutes to simulate a drying process in an automatic dish machine. The glasses were removed from the oven, allowed to cool to ambient temperature, and then a line of "lipstick 2" was applied around the entire rim of each glass as shown in the summary below. The glasses were then placed in the Better Built Dish machine and subjected to a 2 min wash cycle utilizing only water.

Post Wash Cycle Image Analysis:

Examples 13, 14, and 15 were evaluated by both visual inspection and color analysis. Images were obtained by taking a digital photo of all the glasses under identical lighting. Subsequent image analysis was done using ImageJ software version 1.46r (Rasband, W. S., ImageJ, U.S. National Institutes of Health, Bethesda, Md., USA, http://imagej.nih.gov/ij/, 1997-2012). The following thresholds were set and applied to each image: Hue 188-255; Saturation, 0-255; Bright 142-255. The Histogram function was then utilized to count the number of black pixels on equivalent areas of the glasses which is representative to the amount of lipstick on the surface. A quantitative comparison of pre washing and post washing was then made.

Summary of Lipstick Removal Examples 13, 14 and 15

| Example ID | Pre Wash Image Count | Post Wash Image Count | % Removed (by Image Count) | % Removed (by Visual) |
|---|---|---|---|---|
| Example 13 | 22,976 | 0 | 100 | 100 |
| Example 14 | 19,899 | 625 | 97 | >95 |
| Comparative Example 15 | 29,910 | 9,703 | 68 | <50 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of washing and/or rinsing tableware, the method comprising:
   providing tableware; and
   contacting the tableware with a composition comprising a zwitterionic sulfonated silane;
   wherein the zwitterionic sulfonated silane has the following formula (Formula II):

$(R^1O)_p—Si(Q^2)_q-W—N^+(R^2)(R^3)—(CH_2)_m—SO_3^-$  (II)

wherein:
   each $R^1$ is independently a hydrogen, methyl group, or ethyl group;
   each $Q^2$ is independently selected from hydroxyl, alkyl groups containing from 1 to 4 carbon atoms and alkoxy groups containing from 1 to 4 carbon atoms;
   each $R^2$ and $R^3$ is independently a saturated or unsaturated, straight chain, branched, or cyclic organic group, which may be joined together, optionally with atoms of the group W, to form a ring;
   W is an organic linking group;
   p is an integer of 1 to 3;
   m is an integer from 1 to 4;
   q is 0 or 1; and
   p+q=3.

2. The method of claim 1 wherein the zwitterionic sulfonated silane is

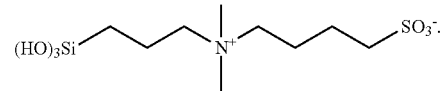

3. The method of claim 1 wherein providing tableware comprises providing dirty tableware, and contacting the dirty tableware comprises washing the dirty tableware.

4. The method of claim 3 wherein contacting the dirty tableware comprises washing the dirty tableware followed by rinsing the tableware to provide a protective layer.

5. The method of claim 1 wherein providing tableware comprises providing clean tableware, and contacting the tableware comprises rinsing the clean tableware to provide a protective layer.

6. The method of claim 1 wherein the composition further comprises a metal salt.

7. The method of claim 6 wherein the metal salt comprises a combination of a source of aluminum ion and a source of zinc ion.

8. The method of claim 7 wherein the composition further comprises a surfactant.

9. The method of claim 8 wherein the surfactant is a nonionic ethylene oxide containing surfactant.

10. The method of claim 1 wherein the composition further comprises a hydrophilic polymer.

11. The method of claim 10 wherein the hydrophilic polymer is a polycarboxylate.

12. The method of claim 1 wherein the composition further comprises an alkaline source.

13. The method of claim 12 wherein the alkaline source comprises a metal carbonate, an alkali metal hydroxide, or a combination thereof.

14. The method of claim 1 wherein the tableware is glassware.

15. The method of claim 1 wherein a dried coating of the composition on a substrate surface has a contact angle of less than 40 degrees.

16. A rinse-aid composition comprising:
a zwitterionic sulfonated silane;
a metal salt; and
a surfactant;
wherein the metal salt comprises at least one of a source of aluminum ion and a source of zinc ion.

17. The composition of claim 16 further comprising a hydrophilic polymer.

18. The composition of claim 17 wherein the hydrophilic polymer is a polycarboxylate.

19. The composition of claim 16 wherein a dried coating of the composition on a substrate surface has a contact angle of less than 40 degrees.

20. The composition of claim 19 wherein the zwitterionic sulfonated silane has the following formula (Formula II):

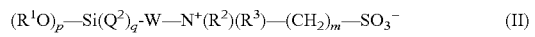

wherein:
each $R^1$ is independently a hydrogen, methyl group, or ethyl group;
each $Q^2$ is independently selected from hydroxyl, alkyl groups containing from 1 to 4 carbon atoms and alkoxy groups containing from 1 to 4 carbon atoms;
each $R^2$ and $R^4$ is independently a saturated or unsaturated, straight chain, branched, or cyclic organic group, which may be joined together, optionally with atoms of the group W, to form a ring;
W is an organic linking group;
p and m are integers of 1 to 3;
q is 0 or 1; and
p+q=3.

21. The composition of claim 20 wherein the zwitterionic sulfonated silane is

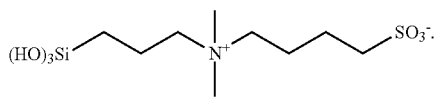

22. The composition of claim 16 wherein the metal salt comprises a combination of a source of aluminum ion and a source of zinc ion.

23. The composition of claim 16 wherein the surfactant is a nonionic ethylene oxide containing surfactant.

24. The composition of claim 16 further comprising a nonpolymeric organic acid with one or more carboxylic acid moieties per molecule.

25. A solid rinse-aid composition comprising:
a zwitterionic sulfonated silane;
a surfactant; and
a solidification agent.

26. The composition of claim 25 further comprising a hydrophilic polymer.

27. The composition of claim 26 wherein the hydrophilic polymer is a polycarboxylate.

28. The composition of claim 25 wherein a dried coating of the composition on a substrate surface has a contact angle of less than 40 degrees.

29. The composition of claim 28 wherein the zwitterionic sulfonated silane has the following formula (Formula II):

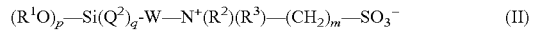

wherein:
each $R^1$ is independently a hydrogen, methyl group, or ethyl group;
each $Q^2$ is independently selected from hydroxyl, alkyl groups containing from 1 to 4 carbon atoms and alkoxy groups containing from 1 to 4 carbon atoms;
each $R^2$ and $R^3$ is independently a saturated or unsaturated, straight chain, branched, or cyclic organic group, which may be joined together, optionally with atoms of the group W, to form a ring;
W is an organic linking group;
p and m are integers of 1 to 3;
q is 0 or 1; and
p+q=3.

30. The composition of claim 29 wherein the zwitterionic sulfonated silane is

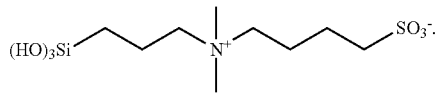

31. The composition of claim 25 further comprising a metal salt.

32. The composition of claim 31 wherein the metal salt comprises a combination of a source of aluminum ion and a source of zinc ion.

33. The composition of claim 25 wherein the surfactant is a nonionic ethylene oxide containing surfactant.

34. The composition of claim 25 further comprising a nonpolymeric organic acid with one or more carboxylic acid moieties per molecule.

35. A solid tableware detergent composition comprising:
a zwitterionic sulfonated silane;
a surfactant;
an alkaline source; and
a solidification agent.

36. The composition of claim 35 wherein a dried coating of the composition on a substrate surface has a contact angle of less than 40 degrees.

37. The composition of claim 36 wherein the zwitterionic sulfonated silane has the following formula (Formula II):

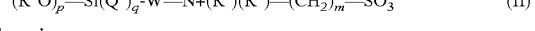

wherein:
each $R^1$ is independently a hydrogen, methyl group, or ethyl group;
each $Q^2$ is independently selected from hydroxyl, alkyl groups containing from 1 to 4 carbon atoms and alkoxy groups containing from 1 to 4 carbon atoms;
each $R^2$ and $R^3$ is independently a saturated or unsaturated, straight chain, branched, or cyclic organic group, which may be joined together, optionally with atoms of the group W, to form a ring;
W is an organic linking group;
p and m are integers of 1 to 3;
q is 0 or 1; and
p+q=3.

38. The composition of claim 37 wherein the zwitterionic sulfonated silane is

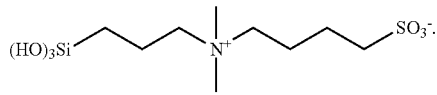

39. The composition of claim 35 wherein the alkaline source comprises a metal carbonate, an alkali metal hydroxide, or a combination thereof.

40. The composition of claim 35 wherein the surfactant is a nonionic ethylene oxide containing surfactant.

* * * * *

UNITED STATES PATENT AND TRADEMARK OFFICE
CERTIFICATE OF CORRECTION

| | | |
|---|---|---|
| PATENT NO. | : 9,518,245 B2 | Page 1 of 1 |
| APPLICATION NO. | : 14/571444 | |
| DATED | : December 13, 2016 | |
| INVENTOR(S) | : James Gardner | |

It is certified that error appears in the above-identified patent and that said Letters Patent is hereby corrected as shown below:

Column 6
Line 10, delete "$(HO)_3Si-CH_2CH_2CH_2SO_3H^+$;" and insert -- $(HO)_3Si-CH_2CH_2CH_2SO_3^-H^+$; --, therefor.
Line 12 (approx.), delete "$(HO)_3Si-C_6H_4-CH_2CH_2SO_3H^+$;" and insert -- $(HO)_3Si-C_6H_4-CH_2CH_2SO_3^-H^+$; --, therefor.
Line 14 (approx.), delete "$(HO)_2Si-[CH_2CH_2SO_3H^+]_2$;" and insert -- $(HO)_2Si-[CH_2CH_2SO_3^-H^+]_2$; --, therefor.
Line 16 (approx.), delete "$(HO)-Si(CH_3)_2-CH_2CH_2SO_3H^+$;" and insert -- $(HO)-Si(CH_3)_2-CH_2CH_2SO_3^-H^+$; --, therefor.

Column 9
Line 61, delete "re" and insert -- are --, therefor.

Column 10
Line 12 (approx.), delete "$(PO)_y(EO)_x(PO)_y(EO)_x(EO)_x(PO)_y$" and insert -- $(PO)_y(EO)_x(PO)_y(EO)_x(PO)_y$ --, therefor.
Line 38 (approx.), delete "hie" and insert -- the --, therefor.

Column 13
Line 55, after "minutes" insert -- . --.

Column 17
Line 4, delete "ene" and insert -- ethylene --, therefor.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*